United States Patent [19]
Kaster

[11] 3,825,957
[45] July 30, 1974

[54] PIVOTING DISC HEART VALVE WITH ROD GUIDE

[76] Inventor: Robert L. Kaster, 15 Parkwood Rd., Trumbull, Conn. 06611

[22] Filed: Aug. 22, 1972

[21] Appl. No.: 282,706

[52] U.S. Cl. .................. 3/1, 3/DIG. 3, 137/527.8
[51] Int. Cl. .............................................. A61f 1/22
[58] Field of Search .... 3/1, DIG. 3; 137/527, 527.4, 137/527.8

[56] References Cited
UNITED STATES PATENTS

| | | | |
|---|---|---|---|
| 3,099,016 | 7/1963 | Edwards | 3/1 |
| 3,371,352 | 3/1968 | Siposs et al. | 3/1 |
| 3,438,394 | 4/1969 | Nakib | 3/1 X |
| 3,451,067 | 6/1969 | Jordan | 3/1 |
| 3,476,143 | 11/1969 | Kaster | 3/1 X |
| 3,546,711 | 12/1970 | Bokros | 3/1 |
| 3,587,115 | 6/1971 | Shiley | 3/1 |
| 3,594,824 | 7/1971 | Nakib | 3/1 |
| 3,623,212 | 11/1971 | Child | 3/1 |
| 3,763,548 | 10/1973 | Anderson | 3/1 X |

FOREIGN PATENTS OR APPLICATIONS

1,160,009   7/1969   Great Britain .................. 3/DIG. 3

*Primary Examiner*—Richard A. Gaudet
*Assistant Examiner*—Ronald L. Frinks

[57] ABSTRACT

A heart valve having a held pivoting disc for controlling the flow of blood. The disc is located within a passage in the base of the valve. Inwardly directed proximal and distal pivots control the pivoting movement of the disc. The pivots are offset from a diameter of the disc so that the disc pivots between its open and closed positions between its center and an outer peripheral edge of the disc. The disc is haeld in free-floating assembled relation with the pivots and base with a curved retaining rod having a curved end projected through a central hole in the disc. A suture collar surrounds and is mounted on the outer portions of the base. A low friction sleeve interposed between the base and the collar permits rotation of the valve relative to the suturing collar after the collar has been attached to the heart tissue.

12 Claims, 10 Drawing Figures

PIVOTING DISC HEART VALVE WITH ROD GUIDE

BACKGROUND OF INVENTION

Heart valve prostheses are used in patients whose natural valves are damaged by congenital malformations or diseases and associated scarring and calcification. Numerous heart valve designs have been developed using either a ball, leaflet, or disc valving member. Each of these designs has certain advantages as well as deficiencies. They attempt, but do not achieve, the duplication of healthy natural heart valves. Problems of prosthetic heart valves are largely due to the shape and operating structure of the valves and the materials used in the valves. Some of the limitations of currently used heart valves are:

1. low efficiency and high pressure gradient across the valve;
2. high structural profile;
3. localized sites of wear and fatigue;
4. chemical breakdown and absorption of water and body fluids;
5. regions of blood stagnation;
6. structures that cause turbulence, regurgitation and eddy currents in the blood flow;
7. structure that can result in formation of clot streamers; and
8. malfunction of the movable valving member.

Durability is a crucial factor in the clinical applicability of any heart valve, as a heart valve must open and close approximately four million times a year. It is imperative that the material used in the heart valve be immune from biochemical degradation and mechanical failure due to wear and fatigue of rubbing or flexing of the components of the valve. Biodegradation is interrelated with mechanical failure as it accelerates material fatigue and material breakdown. Rubbing and wear can accelerate the biochemical reaction, continually exposing new surfaces to corroding media.

Leaf-type valves, as disclosed by Lord In U.S. Pat. No. 2,682,057 and Servelle in British Patent No. 1,160,008, and disc-type valves as disclosed by Wada in U.S. Pat. No. 3,445,863; Schimert et al. in U.S. Pat. No. 3,538,514 and Bokros in U.S. Pat. No. 3,546,711, have low pressure gradients and fair flow characteristics.

De Laszlo, in U.S. Pat. No. 3,526,906, discloses prosthetic implants made from carbonaceous materials. The heart valve implant has a rigid base of carbon or graphite carrying a silicone rubber ball or a disc having legs of plastic material. Bokros, in U.S. Pat. No. 3,546,711, shows a carbon coated valve having a gate pivoted on a fixed pin. Cruz et al., in U.S. Pat. No. 3,367,364 and Kaster, in U.S Pat. No. 3,476,143, disclose several pivoting disc heart valve designs. Bjork has described a disc-type heart valve in the *Scandinavian Journal of Thoracic and Cardiovascular Surgery* 3; 1-10, 1969.

Nakib, in U.S. Pat. No. 3,438,394, discloses in FIGS. 8 and 9 a heart valve having a toroidal valving member that has a combined linear and angular movement as it opens and closes. Jordan, in U.S. Pat. No. 3,451,067, shows a heart valve having a check linearly guided on a rod. These valves, except for the Kaster and Bjork valves, are not pivoting disc valves. The base and disc pivoting structures of these valves are not adapted to be made entirely of rigid carbon materials. Parts of either the base or the pivoting structure must be movable or flexible to permit assembly of the disc into the base. The plastic materials used in the discs are, over a period of time, susceptible to biodegradation as they tend to take up moisture and other body fluids, proteins and enzymes which may eventually deteriorate the disc, inhibiting the operation of the valve. Also, the plastic materials do not have dimensional stability when subjected to steam autoclaving for sterilization.

Clinical use of pivoting disc valves wherein the valving member angularly moves to open and closed positions has shown that it is desirable to adjust the angular position of the valve after it has been implanted in the heart. The base of the valve is rotated relative to the suturing member secured to the heart tissue to orientate the valve member, as a pivoting disc, away from calcifications which can interfere with the free movement of the valving member. The valve is rotated with the handle or holder used to position the valve during the implant procedure. In order to permit angular orientation of the valve after it has been implanted, the suturing member has a loose fit on the valve base. This loose relationship between the suturing member and base is undesirable as the valve may shift in use and move or slide relative to the suturing member.

SUMMARY OF INVENTION

The invention broadly relates to a check valve for controlling the flow of fluid through a passage in a housing or ring. The invention is specifically directed to a heart valve prosthesis having a pivoting disc means movable between open and closed positions relative to a base to control the flow of blood through a passage in the base. The disc means is located within the passage and has an outer annular peripheral edge cooperating with an inside wall of the base to restrict the flow of blood through the passage when the disc means is in its closed position. A means secured to the base has a rod section extended through a central hole in the disc means to hold the disc mans in free-floating relation with the base and guide the pivotal movement of the disc means. The disc means is free to rotate about its central axis as it pivots between open and closed positions. Pivot means can be located on the base offset from a diameter of the passage and are engageable with the disc means for controlling the pivotal movement of the disc means with the rod section off center from the diameter of the disc means. The pivot means include members or legs engageable with separate proximal and distal portions of the disc means during movement of the disc means.

In one form of the heart valve, the disc and base have coatings or outer skins of Pyrolite carbon. The rod section is located adjacent the distal side of the disc and secured to the base. The rod section is curved and projects through a center hole in the disc means terminating in an end located adjacent the proximal side of the disc means when it is in its closed position. Another form of the heart valve has a retaining rod located adjacent the proximal side of the base and extended through a hole in the valving disc.

Referring to the drawings, there is shown in FIGS. 1-4 a one-way valve, specifically a heart valve, adapted for use in the mitral position of a human heart. The valve, indicated generally at 20, is in assembled relation with a mitral suturing member or sewing ring indicated generally at 21. The valve 20 has a base or annular housing 22 associated with a movable valving member or disc 29. The housing 22 has an annular inner wall 23 defining a passage 24 through the valve. Extended outwardly from the upper, or distal, edge of the housing 22 is an annular flange 26. A similar outwardly directed annular flange 27 is at the lower, or proximal, side of the housing 22. The housing 22 has a cylindrical outer circumferential wall 28 located between the flanges 26 and 27 for accommodating the suturing member 21.

The valving member 29 is a generally flat disc having a circumferentially uninterrupted outer peripheral edge 30 which cooperates with the inner wall 23 to restrict reverse flow of blood through passage 24 when the disc is in the closed position. The outer peripheral edge 30 of the disc 29 is spaced from the inner wall 23 by a small annular space 31. The space 31 is of a size to permit limited reverse, or retrograde, flow of blood through the passage 24 when the disc is in the closed position. Disc 29 is retained in free floating relationship on the base with a retaining means shown as a rod 37. The disc 29 is free to randomly rotate about its central axis as it angularly moves between its open and closed positions to control one-way movement of blood through the valve passage 24.

Figures 1, 2, 3:
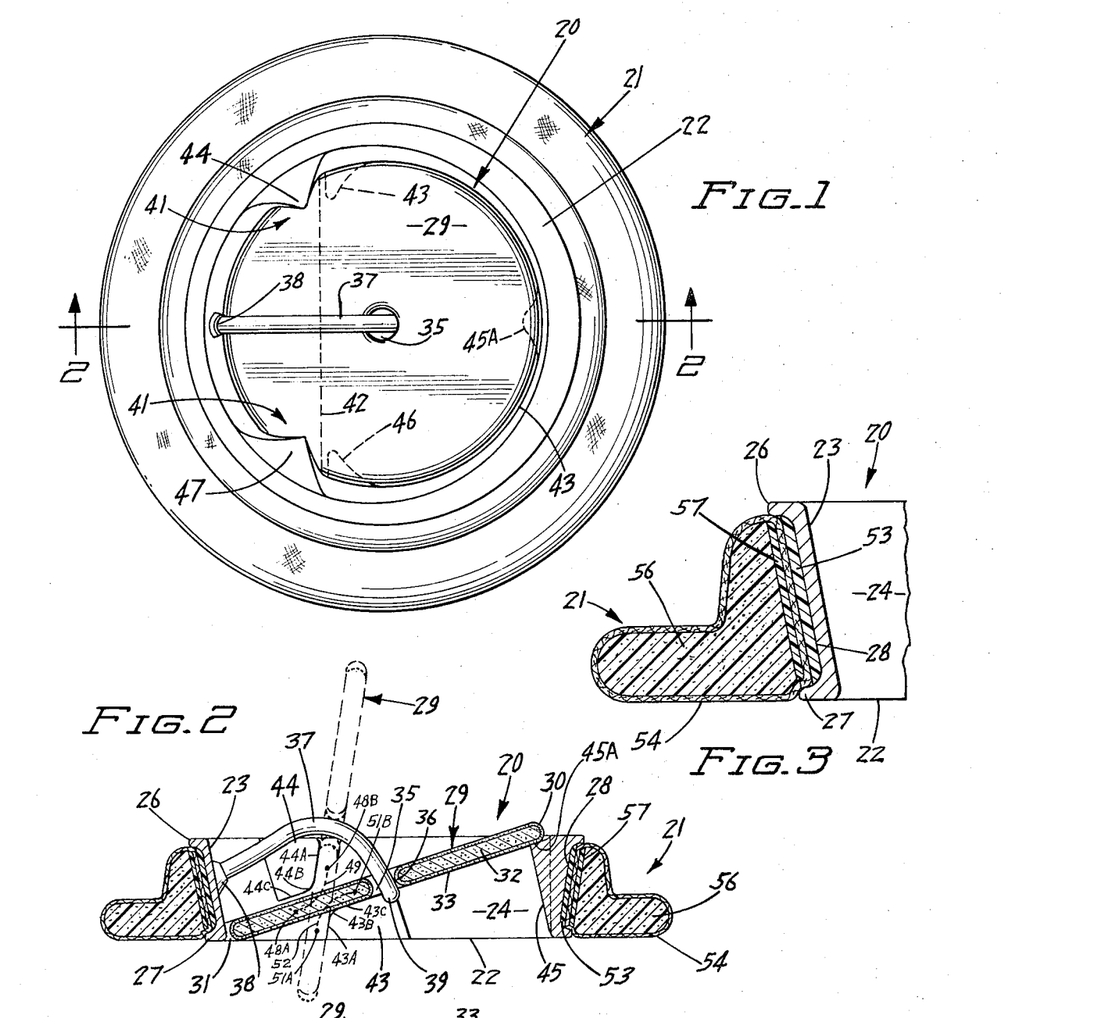
FIG. 1 is a top plan view of a heart valve in assembled relation with a suturing member of the invention.
FIG. 2 is a sectional view taken along the line 2—2 of FIG. 1.
FIG. 3 is an enlarged sectional view of the suturing member mounted on the base of the heart valve.
Figure 4:
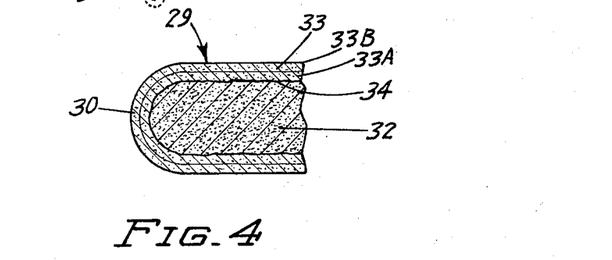
FIG. 4 is an enlarged fragmentary sectional view of an outer peripheral portion of the disc of the heart valve.

Referring to FIGS. 2 and 4, disc 29 has a core or substrate 32 that is entirely covered with a Pyrolite carbon coating or skin 33. The skin is positively joined to the substrate by a bond 34. The substrate 32 is a polycrystalline graphite coated with a silicone alloyed Pyrolite carbon skin 33. Substrate 32 may have a density less than the density of blood. Also, the substrate 32 can have a hollow chamber. Skin 33 has a Pyrolite carbon prime layer 33A covered with a Pyrolite carbon finish layer 33B. Layers 33A and 33B are deposited separately at low temperatures. The thermal coefficient of expansion of the substrate graphite is such that during cooling after application of skin 33, the outer Pyrolite carbon layer 33B is forced into a compressive state of stress. This enhances the toughness and wear characteristics of the skin 33. The Pyrolite carbons are deposited on the substrate in a fluidized bed of hydrocarbon containing gaseous environment. These carbons are stronger and tougher than other bulk forms of carbons. The coatings can be applied to a variety of substrates including metal, ceramics and graphite. The substrates can have complex shapes and corners without danger of delaminating and cracking. The process of depositing Pyrolite carbons in this manner is described in U.S. Pat. No. 3,579,645.

The disc has a central hole 35 for accommodating the curved retainer element or rod 37. The outer or base end 38 of rod 37 is secured to the inside of housing 22 and projects upwardly and radially toward the center of passage 24. The free inner portion of rod 37 is curved downwardly generally along the pivotal arc or path of the angular movement of disc 29 so that it has minimum interference with the pivoting of the disc. The inner end 39 of rod 37 projects through the center hold 35 of disc 29 when the disc is in the closed position. Rod 37 is slightly smaller in diameter than the diameter of hole 35 at all times. This diametric relationship between the rod and the hole also permits some movement or shifting of the disc in its flat plane as it opens and closes. Rod 37 has a cross sectional size smaller than the size of hole 35 in disc 29 whereby blood can flow through the hole.

As shown in FIG. 2, disc 29, when in the closed position, is inclined relative to a longitudinal axis of passage 24. This inclination is preferably 18° with respect to the horizontal. It is understood that other angles of inclination can be utilized. Disc 29 angularly moves from the closed position, as shown in broken lines, when there is an increase in the pressure of blood on the proximal side of the disc. When fully opened, the disc 29 is at a slight angle, preferably 75°–80°, with respect to the horizontal or transverse axis of the passage 24 and is located laterally of the central longitudinal axis of the passage 24. This permits free central flow of blood through passage 24 while at the same time it allows the blood to flow on opposite sides of disc 29. The pivotal movement of disc 29 is controlled by pivot means indicated generally at 41 which provide the disc with an off-center pivoting movement. The pivotal movement of disc 29 may be viewed with respect to a reference chord line 42. Chord line 42 is spaced from the center opening 35 and inwardly of the periphery of the disc at a point along the line which is parallel to the chord reference line 42.

Pivot means 41 comprise a first pair of pivots 43 and 44 directed inwardly into passage 24 and a second pair of pivots 46 and 47 directed generally toward the first pair of pivots and into passage 24. Each pair of pivots has a proximal pivot and a distal pivot, located on opposite sides of the disc, to accommodate a portion of the disc. The pairs of pivots are substantially identical in structure. The following description is limited to pivots 43 and 44, as shown in FIG. 2.

Pivot 43 has an inwardly directed leg, projection or element having a first generally upright surface of face 43A which merges into a curved corner 43B. The corner 43B joins to an upper inclined surface or face 43C that extends circumferentially toward the diameter of the base. The pivot 44 is a leg, projection, or element having a generally upright surface or face 44A which is generally parallel to face 43A. Face 44A merges with a round corner 44B. Corner 44B is joined to a lower inclined surface or face 44C. Face 44C extends away from the diameter of the disc. Corners 43B and 44B are spaced from each other a distance slightly greater than the thickness of disc 29 to provide for free pivoting and rotation of the disc relative to the pivots.

The inner wall of base 22 diametrically opposite rod 37 has a slight inwardly directed projection or stop 45 with an upper face 45A engageable with a portion of the disc when it is in the closed position, as shown in FIG. 2. Stop 45 functions in concert with the upper face of each of proximal pivots 43, 46 and the lower face of each distal pivot 44, 47 as a structure to limit the closed position of disc 29. When the disc is in the maximum open position, it engages the generally upright faces 43A and 44A of pivots 43, 44 and 46, 47 which serve as stops to limit the open position of disc 29, as shown in broken lines in FIG. 2.

Referring to FIG. 2, with disc 29 in the closed position, the disc will initially move up and then pivot around fulcrum corner 44B. Pivot axis 48A will follow the curved path 49 until the disc is in the full open position. At that time the pivot axis 48A will be at 48B adjacent the generally upright stop face 44A. The pivot axis 48 of the disc generally follows the curvature of the fulcrum surface. During opening of the disc, the pivot axis moves upwardly, or in the proximal direction and toward the center of the disc. This pivotal movement reduces the impact of disc 29 on the stop surfaces 43A and 44A of each pivot.

The reduction of pressure brought on the proximal side of the valve will close the disc 29. The disc will initially drop a sight amount and pivot about the pivotal chord axis 51A. As the disc closs, the chord axis moves along the curved line 52 until the disc is closed. When the disc is closed, the pivotal axis is at 51B. During closing of the disc, the pivotal chord axis raises, or moves in the proximal direction, and shifts generally toward the center or diameter of the disc, thereby reducing the impact of the disc on the closed stop surfaces 43B, 44B and 45A. As the pivot axis shifts toward the diameter of the disc, the relative balancing weight of the disc in addition to the fluid acting on the distal surface of the disc will tend to balance the disc on the proximal pivots 43 and 46 and thereby reduce the closing momentum of the disc. During the opening and closing episodes of the disc, the chord pivot axis of the disc remains parallel to and is unaltered with respect to the chord reference axis 42.

Referring to FIGS. 2 and 3, the suturing member 21 is located around the base 22 between the flanges 26 and 27. A sleeve 53 of plastic material having low friction characteristics, as Teflon or the like, is positioned adjacent cylindrical outer circumferential wall 28 of the base between flanges 26 and 27. The suturing member 21 comprises a fabric cover 54. The cover 54 is a biologically inert, porous material that is compatible with the chemicals and fluids of the body and does not deteriorate with time. The cover 54 can be an interlaced or knitted fabric to provide a mesh or spaces into which the living tissue of the heart grows in the healing process. This forms a permanent union with the suturing member and living tissue independent of the sutures applied by the surgeon. The cover 54 can be made entirely of a synthetic fiber, as DuPont "Teflon" or "Dacron". Enclosed within cover 54 is a body or core of plastic material 56. The core of plastic material 56 has an outer or peripheral surface that is bonded to the inside surface of the cover 54 during the process of making the suturing member. Stitches (not shown) can be used to secure the ends of the cover 54 together to form a continuous tubular member that surrounds the core of plastic material 56. A cylindrical sleeve member or collar 57, of heat shrinkable plastic or like material, is used to uniformly hold a portion of the cover 54 in surface engagement with the sleeve 53. Cylindrical member 57 is heat shrunk to hold the suturing member in engagement with sleeve 53 with force sufficient to allow the rotation of base 22 relative to the suturing member 21 after the suturing member 21 has been attached to the heart tissue. This allows the surgeon to orientate the position of the heart valve in the heart after it has been implanted to avoid any obstructions that may interfere with the proper functioning of valve disc 29.

Core material 56 is preferably a pliable plastic material, as Dow-Corning "Silastic", fluorosilicone rubber, or a similar synthetic resinous plastic material that is compatible with human tissue and body fluids. In addition, core material 56 is sterilizable, biologically inert, non-irritating and non-toxic to body tissues and body fluids. On heat curing the plastic core material 56, a uniform bond is achieved between the outer peripheral surface of the core material and the inside surface of the cover 54. This eliminates any pockets or separations between the cover and the core material which collect blood and other body fluids. Core material 56 cures at a relatively low temperature to a semi-rigid, relatively non-elastic plastic which retains its molded shape. During curing of core material 56, the heat will cause the collar 57 to uniformly shrink in diameter so that it will hold the cover in light frictional engagement with uniform circumferential force on sleeve 53. The process of forming the suturing member on the base of a heart valve does not form a part of this invention.

Figures 5, 8:
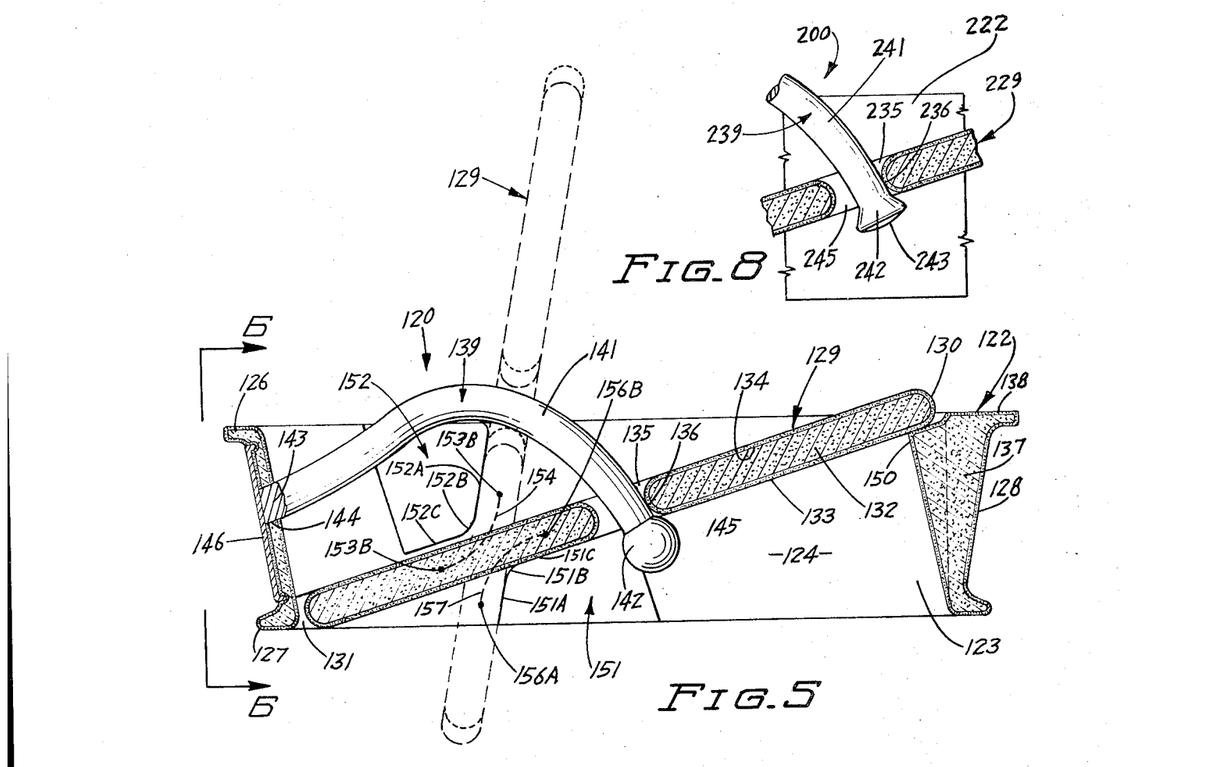
FIG. 5 is a sectional view similar to FIG. 2 of a modified heart valve of the invention.
FIG. 8 is a sectional view of the center section of a valve disc and retaining rod of a modification of the valve shown in FIG. 5.

Referring to FIG. 5, there is shown a modification of the heart valve of the invention, indicated generally at 120. The vlave 120 has a base or annular housing 122 and a movable valving member or disc 129. Housing 122 has an annular inner wall 123 defining a passage or opening 124 through the housing whereby blood can flow through the passage. The valving disc 129 functions to permit one-way flow of blood through the passage 124 and restrict the flow of blood through the passage 124 in the opposite direction.

Extended outwardly from the upper or distal edge of the housing 122 is an annular flange 126. The lower, or proximal, side of the housing 122 has a similar outwardly directed flange 127. A cylindrical outer circumferential wall 128 is located between the flanges 126 and 127 for accommodating an annular suturing member or sewing ring (not shown).

The valving member, or occluder, 129 is a generally flat disc having a circumferentially uninterrupted outer peripheral edge 130 which cooperates with portions of the inner wall 123 to limit or restrict reverse flow of blood through the passage 124 when the disc is in the closed position. The outer peripheral edge 130 of the disc 129 is slightly spaced from the inner wall 123 by an annular space 131. The space 131 is of a size to permit limited reverse, or retrograde, flow of blood through the passage 124 when the disc 129 is in the closed position, as shown in full lines in FIG. 5.

The disc 129 has a core or substrate 132 that is entirely covered with a coating or skin 133. Preferably, the skin 133 is of a silicone-alloyed Pyrolite carbon material. The skin can have a plurality of layers, as shown in FIG. 4. The substrate 132 can be any rigid material, as metal, plastic, carbon or the like. The substrate may contain a hollow chamber to reduce its weight. The skin 133 is attached to the outer surface of the substrate with a bond 134 in the process of applying the skin 133 to the substrate 132.

The disc 129 has a hole 135 in the center portion thereof. The inner annular wall 136 surrounding the hole 135 has a semicircular cross sectional shape.

Housing 122 has a substrate 137 entirely covered with a skin or coating 138. Preferably, the skin 138 is of a silicone-alloyed Pyrolite carbon material having a plurality of layers similar to skin 33 shown in FIG. 4.

Disc 129 is retained in free floating relationship on the base 122. The disc 129 is free to rotate about its central axis 360° as it angularly moves between its open and closed positions to control the one-way movement of blood through passage 124. A retainer, indicated generally at 139, is fixed to the housing and serves to maintain the disc in free floating assembled relation with the housing. The retainer 139 is an elongated rod having an inwardly directed, downwardly curved outer section 141 terminating in a generally spherical end 142. Section 141 has an arcuate shape that generally follows the path of angular movement of the inner wall 136 of the disc 129. The end 142 has a diameter slightly smaller than the diameter of the hole 135 and is located on the proximal side of the disc 129. When the disc 129 is in the closed position, the upper portion of end 142 extends a slight distance into the hold 135. The end 142 restricts the size of space 145 between the retainer and the disc when the disc is in the closed position.

Figure 6:
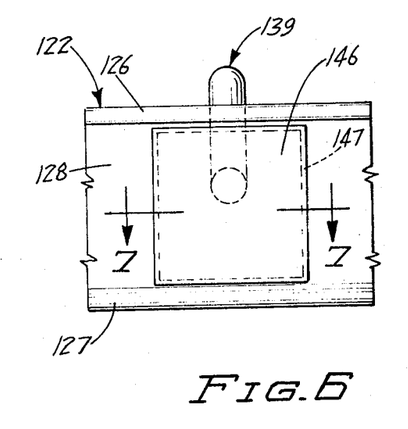
FIG. 6 is a fragmentary side elevational view taken along line 6—6 of FIG. 5.
Figure 7:
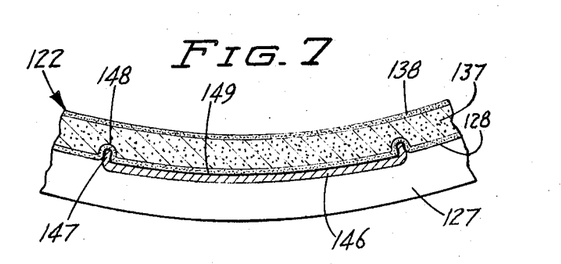
FIG. 7 is an enlarged sectional view taken along the line 7—7 of FIG. 6.

The outer end 143 of the retainer 139 projects through a hole 144 in the housing 122. A rectangular plate 146, shown in FIGS. 6 and 7, secured to the outer end 143, fixes the position of the retainer 139 on the base 122. As shown in FIG. 7, plate 146 has an inwardly directed peripheral rib 147. Rib 147 extends into a groove 148 in the outer wall 128. An adhesive, or bonding material 149 secures the plate 146 to the outer wall 128. The plate 146 may extend into a recess in the wall 128 so that the plate and wall have a substantially continuous outer surface.

The pivotal movement of the disc 129 is controlled with pivot means which provide the disc with an off-center pivoting movement. The disc pivots between its outer edge and its diameter between an open position and a closed position. The pivot means comprise first and second pairs of pivots similar to pivots 43, 46 and 44, 47 shown in FIG. 1. Pivots 151 and 152, projected into the passage 124, are one pair of pivots. An identical pair of pivots projected into passage 124 generally toward the first pair of pivots are located on the opposite portion of the base in a manner as shown in FIG. 1. The pairs of pivots are located off-center or in eccentric locations relative to a diameter of the passage 124 whereby the disc 129 pivots about an off-center or eccentric axis as it opens and closes. The following description is limited to pivots 151 and 152.

Pivot 151 is a proximal pivot. Pivot 151 has a pivoting, or fulcrum, surface comprising a generally upright inclined side face 151A joined to a curved corner 151B and a top face 151C. Piovt 152 is a distal pivot. Pivot 152 has an upwardly inclined side face 152A extended downwardly to a curved corner 152B which extends to a bottom inclined face 152C. The pivots 151 and 152 are inwardly directed legs, elements or projections which have pivoting or fulcrum surfaces for controlling the arcuate movement of the disc 129.

The housing 122 has an inwardly directed abutment or stop 150 located generally diametrically opposite the retainer 139. The stop 150 projects inwardly into the passage 124 and has an upper face engageable with a portion of the disc 129 when the disc is in the closed position. When the disc 129 is in the closed position, it is inclined relative to the longitudinal axis of the passage 124. This inclination preferably is 18° with respect to the horizontal. It is understood that other angles of inclination can be utilized for disc 129 when it is in the closed position. The disc 129 rests on the proximal pivot surfaces 151C of the proximal pivots and the stop 150 when it is in the closed position. Disc 129 angularly moves from the closed position to the open position, as shown in broken lines in FIG. 5, in response to an increase in the pressure of the blood on the proximal side of the disc. When fully opened, the disc 129 is at a slight angle, preferably 75°-80°, with respect to the longitudinal axis of the passage and is located laterally of the central longitudinal axis of the passage 124. This permits the free central flow of blood through passage 124, while at the same time it allows the blood to flow on opposite sides of the disc. The open position of the disc is determined by side faces 151A and 152A of the proximal and distal pivots 151 and 152. The opposite portions of the disc 129 engage the side faces of the pivots to limit the opening pivotal motion of the disc.

When the disc 129 is in the closed position, it will initially move up and then pivot around fulcrum corner 152B. The pivot axis 153A will follow the curved path 154 until the disc 129 is in the full open position. At that time, the pivot axis 153A will be at 153B, adjacent the generally upright stop side face 152A. The pivot axis 153A generally follows the curvature of the fulcrum surface of the distal pivots and moves upwardly in the distal direction and toward the diameter of the disc. This pivotal movement of the disc 129 reduces the impact of the disc on the stop faces 151A and 152A of each pivot. The retainer 139 holds the disc 129 in assembled relation with the base 122 with portions of the disc located between the proximal and distal pivots. The disc 129 is free to rotate on the retainer 139 as the rod section 141 is smaller in diameter than hole 135 in the disc 129 and has a curvature that generally follows the curvature of the path of movement of the inner wall 136 of the disc 129.

A reduction in the pressure of blood on the proximal side of the disc 129 will cause the disc 129 to pivot to the closed position. Disc 129 will initially drop a slight amount and pivot about a pivot chord of off-center axis 156A. As the disc 129 closes, the chord axis moves along the curved line 157 until the disc is closed. When the disc 129 is closed, the pivot axis is at 156B. During the closing of the disc, the pivotal chord axis raises or moves in the distal direction and shifts generally toward the center or diameter of the disc. This reduces the amount of impact of the disc 129 on the closing stop 150 and proximal pivot surfaces 151C. As the pivot axis of the disc shifts toward the diameter of the disc, the weight of the disc in addition to the fluid acting on the distal surface of the disc will tend to balance the disc on the proximal pivot 151 and its associate proximal pivot and thereby reduce the closing momentum of the disc.

During the closing and opening episodes of the disc 129, the chord pivotal axis of the disc remains parallel to and is unaltered with respect to a chord reference line or axis that is parallel to the diameter of the disc.

Referring to FIG. 8, there is shown a modification of the end of the retainer of a heart valve, indicated generally at 200. The valve base 222 pivotally carries a disc 229 having a center hole 235. A circular, rounded inner wall 236 surrounds the hole 235. The retainer rod 239 has a curved portion 241 terminating in an end 242. The end 242 has a generally cone shape and has a convex end 243. The cone shape of the end 242 provides a generally uniform space 245 between the rod end 241 and the wall 236 of the disc 229. The remaining structure off the valve 200 is identical to the structure of the valve shown in FIG. 5.

Figure 9:
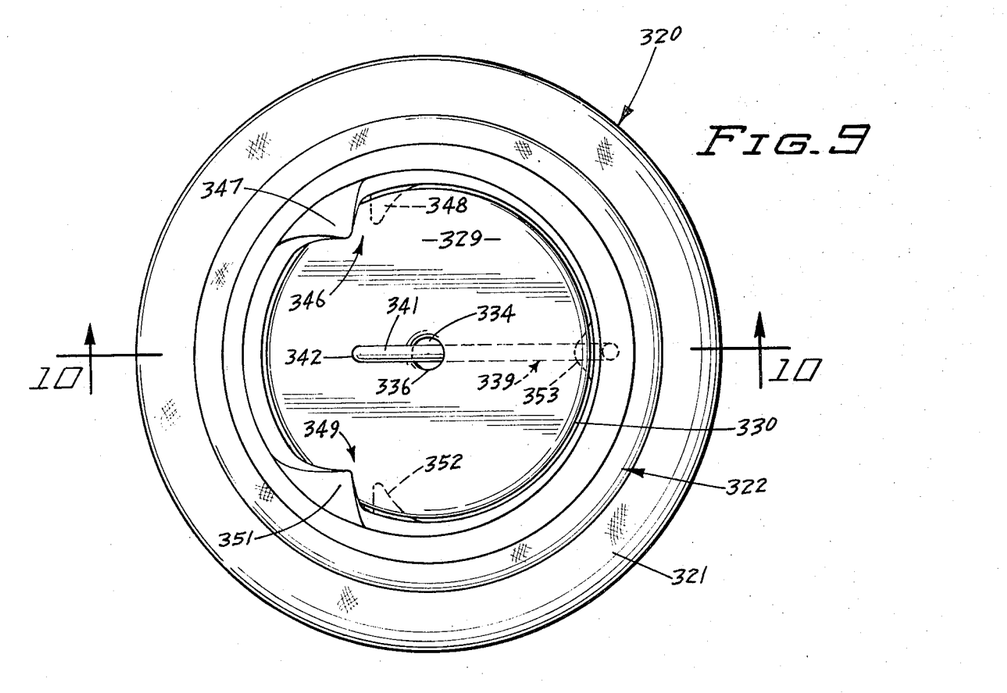
FIG. 9 is a further modification of the heart valve of the invention.
Figure 10:
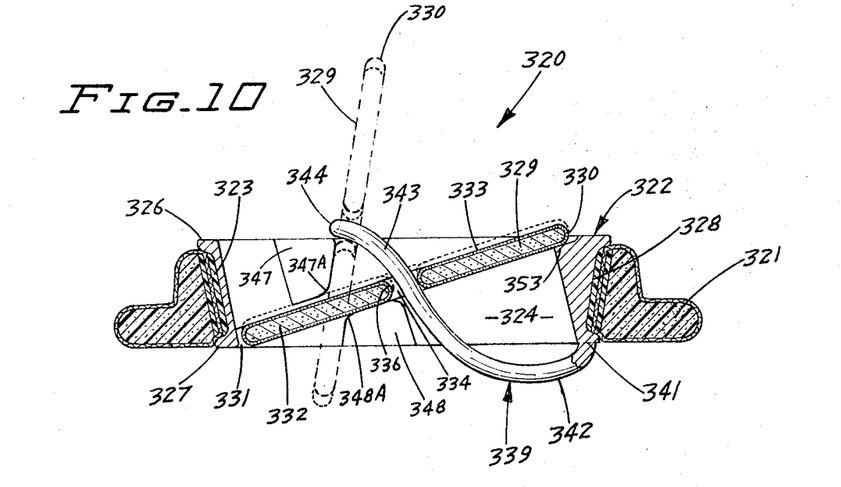
FIG. 10 is a sectional view taken along line 9—9 of FIG. 9.

Referring to FIGS. 9 and 10, there is shown a further modification of the heart valve of this invention indicated generally at 320 in assembled relation with an annular suturing member 321. Valve 320 has a base or annular housing 322 accommodating a movable valving member or disc 329. Base 322 has a generally cylindrical annular inner wall 323 defining a passage or opening 324 permitting the flow of blood through the valve. A valving disc 329 is movably positioned within passage 324 to permit oneway flow of blood through the passage and restrict the flow of blood through passage 324 in the reverse or opposite direction.

Base 322 has a proximal annular flange 326 and distal annular flange 327. A cylindrical outside wall 328 extends between the flanges 326 and 327. The suturing member 321 is mounted on the wall 328. Suturing member 321 is the same construction as suturing member 21 shown in FIG. 3. Other types of suturing members can be mounted on base 322.

Valving disc 329 is a generally flat circular member having a circumferentially uninterrupted outer peripheral edge 330. Edge 330 cooperates with portions of inner wall 323 to restrict or limit reverse flow of blood through passage 324 when the disc is in the closed position, as shown in full lines in FIG. 10. Disc 329 is free to randomly rotate about its central axis, thereby eliminating localized sites or wear and fatigue and avoiding isolated breakdown of the valve structure. The diameter of disc 329 is such that the outer peripheral edge is spaced slightly inwardly from the inner wall 323 by annular space 331. Space 331 is of a size to permit annular limited reverse or retrograde flow of blood through passage 324 when disc 329 is in the closed position. The blood flows between the outer peripheral edge 330 and the inner wall 323 so as to wash the disc and wall surfaces to prevent clot formation and eliminate regions of blood stagnation. Preferably, annular space 331 is of a size to restrict the reverse flow to approximately 5 to 8 percent of the maximum reverse flow of blood.

Disc 329 has a core or substrate 332 that is entirely covered with a coat or skin 333. Skin 333 is a hard, wear-resistant material that is biologically inert and compatible with the material, such as titanium, or the base 322. Preferably, skin 333 is a silicone alloyed carbon material, as Pyrolite carbon. Skin 333 can have a plurality of layers, as shown in FIG. 4. Substrate 332 can be any rigid material, as metal, plastic, carbon, or the like. The substrate can have a hollow chamber or chambers to reduce its weight.

The center portion of disc 329 has a central hole 334. Hole 334 is defined by an inner annular wall 336. The cross sectional shape of wall 336 is a semi-circular configuration whereby the wall 336 does not have any abrupt projections or edges that can interfere with the flow of blood through hole 334 or collect blood tissue.

Disc 329 is movably positioned in a free-floating relationship with the passage 324 of base 322 with a retainer indicated generally at 339. Disc 329 has limited axial movement, as shown in dotted lines in FIG. 10; has limited lateral movement, as shown in broken lines in FIG. 10; and is free to randomly rotate 360° about its central axis as it angularly moves between its open and closed positions. The open position is shown in broken lines in FIG. 10. Retainer 339 is an elongated radially inwardly projected rod extended from a proximal base portion 341 through the central hole 334 of disc 329. Retainer 339 has a generally broad "S" or reversed curve shape and is secured to the lower or proximal portion 341 of the base 322. Preferably, retainer 339 is an integral part of base 322 that has been curved to the shape as shown in FIG. 10. Retainer 339 has a first section 342 extended downwardly and then curved inwardly below the lower or proximal plane of the base 322 to locate section 342 outside of passage 324. A second section 343 projects generally upwardly through the passage in the direction of the flow of blood or distal direction and terminates in a rounded end 344. Sections 342 and 343 have a smooth circular rod shape and are continuous to avoid any pockets or structure on which blood tissues can accumulate. Section 343 has an arcuate shape that generally follows the path of angular movement of the center portion of disc 329 as the disc pivots between its open and closed positions. Section 343 has a circular cross section and a diameter slightly smaller than the diameter of hole 334 thereby allowing a limited amount of blood to flow through the hole at all times and permitting the disc to have limited lateral movement as it pivots between its open and closed positions.

As shown in FIGS. 9 and 10, disc 329 has an off-center pivotal movement so that when the disc is in the open position, the blood has unrestricted centralized flow through passage 324. The blood flows adjacent opposite surfaces of disc 329, thereby washing both sides of the disc. Disc 329 pivots in a chordal region located between its outer peripheral edge and its diameter. Pivot means comprising a first pair of pivots indicated generally at 346 and a second pair of pivots indicated generally at 249 cooperate with the retainer 339 to restrict the movements of the disc as it moves between its open and closed positions. The first pair of pivots includes a proximal pivot 348 extended adjacent a portion of the proximal side of disc 329 and a distal pivot 347. Pivots 347 and 348 are integral with base 322 and extend a short distance into passage 324. Pivots 347 and 348 have fulcrum surfaces 347A and 348A respectively. Pivots 351 and 352 have similar fulcrum surfaces. Pivots 347 and 348 are projections, elements or legs that are spaced from each other a distance slightly greater than the thickness of disc 329. The second pair of pivots 349 are circumferentially spaced from the first pair of pivots and extend into passage 324. The second pair of pivots comprise a distal pivot 351 and a proximal pivot 352. Pivots 351 and 352 are located adjacent opposite sides of the disc and are integral with base 322. Pivots 351 and 352 are projections, elements or legs spaced from each other and extended generally toward the first pair of pivots 346. The pairs of pivots 346 and 349 are located off-center or in eccentric locations relative to the diameter of passage 324 whereby disc 329 pivots about an off-center or eccentric axis as it opens and closes. The pivotal axis of disc 329 generally follows a chordal region of the passage 324 and can shift relative to the diameter of the passage as disc 329 opens and closes. In other words, the limited lateral movement of the disc allowed by the size of hole 334 relative to the diameter of retainer rod 339 permits the pivoting axis of the disc to have a lateral transitory movement during the valving action of the disc. The offset pivotal axis of the disc remains generally parallel to a diameter of the disc whereby the disc has relatively smooth opening and closing movements.

Housing 322 has an inwardly directed abutment or stop 353 located in general vertical alignment with the base portion 341. Stop 353 projects inwardly into the passage and has an upper face engageable with a portion of the disc 329 when the disc is in the closed position. As shown in FIG. 10, when disc 329 is in the closed position, it is inclined relative to the longitudinal axis of passage 324. Preferably, the inclination is 18° with respect to a horizontal plane. It is understood that other angles of inclination can be used for disc 329 when it is in the closed position. Being inclined, the closed disc 329 has a limited amount of angular travel or movement between its open and closed positions. This limited amount of travel eliminates intraorifice obstruction to flow and also minimizes regurgitation of the blood through the valve passage. When fully open, as shown in broken lines in FIG. 10, disc 329 is at a slight angle, preferably 75° to 80° with respect to the longitudinal axis of the passage 324 and is located laterally of the central longitudinal axis of the passage. This produces streamlined unrestricted centralized flow of blood through the passage.

In use, with disc 329 in the closed position as shown in full lines in FIG. 10, it will initially move upwardly or axially to the dotted line position until the distal or upper surface of the disc contacts the distal pivots 347 and 351. Disc 329 will then move around pivot fulcrum surfaces 347A of pivots 347 and 351 about an off center axis. Disc 329 will generally follow the curvature of retainer section 343 until the disc is in the full open position. The disc 329 moves laterally upwardly with the flowing blood indicated by broken lines in the open position of disc 329 in FIG. 10. When the disc is in the full open position, opposite portions engage the proximal and distal pivots which limit the open position of the disc to a slight incline relative to the longitudinal axis of passage 324. During the opening of the disc it is free to randomly rotate 360° about its central axis.

A reduction in pressure of the blood on the proximal side of the disc will cause the disc to initially drop a slight amount and move about proximal pivots 348 and 352, rolling over the fulcrum surfaces 348A of pivots 348 and 352 to its fully closed position shown in full lines in FIG. 10. During the opening and closing episodes of the disc, the pivotal axis of the disc remains parallel to a reference diameter of the disc or any line that is parallel to the reference diameter of the disc. The reference diameter of the disc is normal to the section line 10—10 of FIG. 9.

The heart valve and suturing member has been shown and described with respect to preferred embodiments thereof. Changes, modifications and substitutions of materials, structures, and sizes may be made by those skilled in the art without departing from the spirit of the invention.

The embodiments of the invention in which an exclusive property or privilege is claimed are defined as follows:

1. A heart valve for controlling the flow of blood comprising: a base having a proximal portion and an inner annular wall surrounding a passage for carrying blood in the distal direction through the base; disc means movable to an open position to allow flow of blood through said passage in the distal direction and to a closed position to restrict the flow of blood in the opposite direction through said passage, said disc means being free to rotate about its central axis as the disc means moves between its open and closed positions, said disc means having a circular hole through the central portion thereof and an annular uninterrupted outer peripheral edge cooperating with the inner annular wall to restrict the flow of blood in the opposite direction through said passage when the disc means is in the closed position, pivot means on the base offset from a diameter of the passage, said pivot means having first means engageable with one side of the disc means during opening movement of the disc means and second means engageable with the other side of the disc means during closing movement of the disc means for controlling the pivotal movement of the disc means off-center from a diameter of the disc means, said first means and second means being spaced from each other a distance greater than the thickness of the disc means, and means for holding the disc means in movable assembled relation with the base whereby the disc means is free to rotate about its central axis and is located off-center when in the open position allowing centralized flow of blood through the passage and flow of blood on opposite sides of the disc means, said means for holding the disc means including a rod having a section projected into the passage and extended through the hole in the disc means, said rod being unobstructed between its ends and having a circular cross section and a diameter slightly smaller than the diameter of the hole to allow limited flow of blood through the hole and to permit rotation of the disc means about its central axis and limited lateral movement of the disc means relative to the rod.

2. The heart valve of claim 1 wherein: said first means includes a pair of spaced members located adjacent one side of the disc means and directed into the passage and the second means includes a pair of spaced members located adjacent the other side of the disc means and directed into the passage.

3. The heart valve of claim 1 wherein: said rod is secured to a proximal portion of the base, said section projected in the distal direction into the passage.

4. The heart valve of claim 1 wherein: said rod is secured to a proximal portion of the base and has a general reverse curve shape and extends in a general radial plane relative to the passage, said section projected in the distal direction into the passage.

5. The heart valve of claim 4 wherein: said first means includes a pair of spaced members located adjacent one side of the disc means and directed into the passage and the second means includes a pair of spaced members located adjacent the other side of the disc means and directed into the passage.

6. The heart valve of claim 1 wherein: said rod is secured to a distal portion of the base, said section projected in the proximal direction into the passage.

7. The heart valve of claim 1 wherein: said outer peripheral edge of said disc means is spaced from the inner wall of the base when the disc means is in the closed position whereby limited reverse flow of blood is permitted through said passage.

8. The heart valve of claim 1 wherein: said means for holding the disc means includes means cooperating with the disc means to hold the disc means in an inclined position relative to the transverse plane of the passage when the disc means is in the closed position.

9. The heart valve of claim 1 wherein: said holding means comprises a single rod having a base portion secured to the base and said section being a curved radially inwardly directed portion having an end projected through the hole in the disc means, said curved portion of said rod having a curvature that generally follows the pivotal path of the center hole in the disc means.

10. The heart valve of claim 9 including: means on the end of said rod to restrict reverse flow of blood through the hole in the disc when the disc is in the closed position.

11. The heart valve of claim 1 wherein: said disc means has an outer skin of Pyrolite carbon.

12. The heart valve of claim 1 wherein: said base means and pivot means have outer skins of Pyrolite carbon.

* * * * *

PO-1050
(5/69)

UNITED STATES PATENT OFFICE
CERTIFICATE OF CORRECTION

Patent No. 3,825,957          Dated July 30, 1974

Inventor(s) Robert L. Kaster

It is certified that error appears in the above-identified patent and that said Letters Patent are hereby corrected as shown below:

In the abstract, line 8, "haeld" should be --held--.

Column 2, line 41, "mans" should be --means--.

Column 5, line 29, "sight" should be --slight--.

Column 5, line 30, "closs" should be --closes--.

Column 6, line 37, "vlave" should be --valve--.

Column 8, line 53, "of" should be --or--.

Column 9, line 61, "or" should be --of--.

Signed and sealed this 28th day of January 1975.

(SEAL)
Attest:

McCOY M. GIBSON JR.
Attesting Officer

C. MARSHALL DANN
Commissioner of Patents